United States Patent [19]
Habermehl

[11] Patent Number: 5,921,736
[45] Date of Patent: Jul. 13, 1999

[54] COLLATED DRYWALL SCREWS

[76] Inventor: Gordon Lyle Habermehl, 7528 Hickory Hill Ct., Whites Creek, Tenn. 37189

[21] Appl. No.: 08/871,659

[22] Filed: Jun. 9, 1997

[51] Int. Cl.⁶ .............................. F16B 15/08; F16B 39/00
[52] U.S. Cl. .......................... 411/442; 411/966; 206/345
[58] Field of Search ..................................... 411/442, 443, 411/444, 966; 206/344, 345, 347

[56] References Cited

U.S. PATENT DOCUMENTS

| | | | |
|---|---|---|---|
| 2,590,358 | 3/1952 | Williams | 206/338 |
| 2,909,781 | 10/1959 | Ollig et al. | 206/343 |
| 3,082,425 | 3/1963 | Leslie | 411/442 X |
| 3,358,822 | 12/1967 | O'Connor | 441/442 X |
| 3,478,872 | 11/1969 | Becht | 206/345 X |
| 3,927,459 | 12/1975 | Haytayan | 206/346 X |
| 3,944,068 | 3/1976 | Maier et al. | 206/347 |
| 4,018,334 | 4/1977 | Leijdegard | 206/346 |
| 4,146,071 | 3/1979 | Mueller et al. | 144/32 S |
| 4,167,229 | 9/1979 | Keusch et al. | 206/345 X |
| 4,815,910 | 3/1989 | Potucek | 206/343 X |
| 4,877,135 | 10/1989 | Gabriel et al. | 206/338 X |
| 4,930,630 | 6/1990 | Hagermehl | 206/347 |
| 5,409,111 | 4/1995 | Takumi | 206/344 |

FOREIGN PATENT DOCUMENTS

| | | |
|---|---|---|
| 1040600 | 10/1978 | Canada . |
| 1054982 | 5/1979 | Canada . |
| 2363974 | 8/1974 | Germany . |
| 1224508 | 9/1989 | Japan ..................................... 411/442 |

*Primary Examiner*—Neill Wilson
*Attorney, Agent, or Firm*—Mallinckrodt & Mallinckrodt

[57] ABSTRACT

Collated drywall screws are provided for securing drywall to framing members. A collated screw has screws connected to each other by a holding strip. Each screw is received in a fragible sleeve about its threaded shank such that a screw on being screwed into a workplace is separated from the strip by the head of the screw passing through the sleeve breaking the sleeve. The improvement arises in having the head of the screw spaced from the fragible strip by a distance greater than the thickness of the drywall such that a screw is screwed through the drywall in at least partially into the frame support prior to the head of the screw engaging the frangible strip. The increased engagement with the frame member prevents the screw from stripping in the drywall and drawing drywall powder which may clog the power driver after repeated use. The invention provides drywall screws and a method of driving them which reduces the forces a user must manually apply to a power driver.

20 Claims, 4 Drawing Sheets

COLLATED DRYWALL SCREWS

SCOPE OF THE INVENTION

This invention relates to collated screws and more particularly to a method of securing with collated screws, weaker materials such as drywall to stronger underlying materials.

BACKGROUND OF THE INVENTION

Collated screws are known in which the screws are connected to each other by a retaining strip of plastic material. Such strips are taught for example by U.S. Pat. No. 4,167,229 issued Sept. 11, 1979 and related Canadian Patents 1,040,600 and 1,054,982. Screws carried by such strips are adapted to be successively incrementally advanced to a position in alignment with and to be engaged by a bit of a reciprocating, rotating power screwdriver and screwed into a workpiece. In the course of the bit engaging the screw and driving it into a workpiece, the screw becomes detached from the plastic strip leaving the strip as a continuous length.

Such screw strips are useful for being driven by a power screwdriver such as described in U.S. Pat. No. 4,146,871 issued Mar. 27, 1976.

Drywall is a well known wall covering used extensively to cover interior walls in buildings in the United States of America. Drywall is conventionally used as flat sheets of approximate dimensions of 4 ft by 8 ft (121.92 cm by 243.84 cm). Most commonly used drywall has thicknesses in the range of ½ inch (1.27 cm) or ⅝ inch (1.59 cm) and their metric equivalents. Conventional drywall typically comprises a gypsum core covered on each of its sides by a thin covering conventionally of a paper-like material. Drywall has many different forms providing, for example, increased strength or resistance to water. Conventional drywall can readily be cut or fractured so as to provide for ease of manual cutting the sheets to desired shapes and installation. The internal core of drywall is typically a plaster or gypsum type material which comprises a consolidated mass of material which when subjected to severe localized forces will disintegrate into a fine chalk-like powder.

In typical construction, drywall is applied over framing to form interior walls in a building. For example, conventional walls may be formed as a frame of lumber, for example, 2 inch (5.08 cm) by 6 inch (15.24 cm) wood with a top and bottom frame joined by vertical frame members typically located on 16 inch (40.64 cm) centers. A wood ceiling frame may also, for example, have horizontal stringers on 16 inch centers. After forming the framing, drywall is applied to the framing preferably by screwing the drywall sheets to the wood frame members for the walls and ceilings. For such purposes, preferably screws known as drywall screws are used which are particularly adapted for securing the drywall to the framing.

It is known to provide drywall screws as collated screws in a strip of the type taught by U.S. Pat. No. 4,167,229 and to drive such drywall screws with power screwdriver such as shown in U.S. Pat. No. 4,146,071.

The present inventor has appreciated disadvantages arising with the use of such collated drywall screws with a power driver. One disadvantage is that when driving such collated drywall screws with the power driver, and particularly when driving drywall screws vertically upwardly into a ceiling, powder from the drywall drops downwardly and with time comes to clog and jam the power driver against proper operation. Another disadvantage is that in driving screws into drywall, increased pressure needs to be applied to a power tool by a user to cause a screw to disengage the strip and pass through drywall as contrasted to driving the screws merely into wood. Applying such increased pressure is particularly disadvantage in applying screws into a ceiling or at arms length to one side.

The present inventor has appreciated that the disadvantages which arise in securing drywall with collated screws also arise in securing screws in or through other weak materials which may not have sufficient strength to draw a screw through the strip. Such other weaker materials include rigid foam insulation, insulation panels and cladding panels.

SUMMARY OF THE INVENTION

Accordingly, to at least partially overcome the disadvantages of previously known devices the present invention provides collated screws in a strip configured such that on a screw being driven the screw will be advanced a substantial distance relative its length before the head of the screw engages the strip.

An object is to provide improved collated screws particularly adapted for engagement in weaker materials.

Another object is to provide an improved method of advancing collated screws.

Another object is to provide collated screws in a strip configured such that a screw on being driven will pass through a weaker material and engage in a stronger support or frame under the weaker material before the head of the screw engages the strip to separate the screw from the strip.

Another object is to provide an improved method of securing drywall, insulation, cladding and other weaker materials to underlying stronger materials and an arrangement for collated screws useful therefore.

The present inventor has appreciated that collated screws are carried by vehicles such as strips in which at some point in advancing a screw, increased forces are required to separate the screw from the vehicle that is, increased forces as compared to forces necessary to maintain a bit of a screwdriver in engagement in a socket in the head of a screw. For example, in many screw strips, increased forces are required when the head of the screw engages the strip to separate the screw from the strip.

The inventor has appreciated that advantages arise when the head of a collated screw does not engage the strip, so as to increase the forces required to further advance the screw, until after the screw has become engaged to a desired degree within a workpiece. The location of the strip on the screws with the strip spaced towards the tip from the strip may be advantageously selected so that engagement of the threads of the screw in a workpiece assists in advancing the screw to disengage from the strip. Advantages arise by configuring screws such as drywall screws with the head spaced from the strip by at least ½ of the length of the screw. Preferably, a screw may become engaged in a workpiece, prior to the head engaging the strip, to an extent sufficient that engagement of the threads alone draws the screw with sufficient forces to separate the screw from the sleeve. More preferably, the screw nay pass through a weaker material such as drywall and into a stronger material such as wood framing prior to the head engaging the strip.

Accordingly, in one aspect the present invention provides a method of securing a weaker means to and underlying stronger means with collated screws, which collated screws comprise a plurality of screws, each screw having a head, a tip and a shank therebetween having threads at least proximate the tip, a holding strip holding the screws spaced in a row, each screw received in the strip with the strip about its shank such that a screw on being driven into a workpiece is separated from the screw by the head of the screw engaging the strip, the method comprising:

locating the strip with a screw directed towards the weaker means with its tip proximate the weaker means, rotating the screw while maintaining the strip a first distance from the weaker means and advancing the screw relative the strip into the weaker means, initially, through the weaker means and at least partially into threaded engagement with the stronger means, prior to the head of the screw engaging the strip, and, subsequently, with the screw in threaded engagement in the stronger means, to engage the strip with the head and separate the screw from the strip.

In another aspect the present invention provides collated screws comprising:

a plurality of screws, a holding strip holding the screws spaced in a row with each screw received in the strip with the strip about a shank of the screw such that a screw on being threaded tip first into a workpiece is separated from the strip by a head of the screw engaging the strip, the head being spaced from the strip a distance equal to at least one half of the length of the screw.

In yet another aspect the present invention provides collated drywall screws adapted for securing a layer of drywall to underlying support means comprising:

a plurality of screws, each screw having a head, a tip and a threaded shank, a holding strip holding the crews in parallel relation spaced in a row, the strip having a plurality of spaced parallel fragible sleeve, each screw received in a fragible sleeve about its threaded shank such that a screw on being screwed tip first relative the strip is separated from the strip by the head of the screw passing through the sleeve breaking the sleeve, the head of the sleeve being spaced from the fragible strip by a distance greater than the thickness of the drywall which the screw is to secure.

DETAILED DESCRIPTION OF THE DRAWINGS

Further aspects and advantages will appear from the following description taken together with the accompanying drawing in which.

DESCRIPTION OF THE PREFERRED EMBODIMENT

Figure 1:
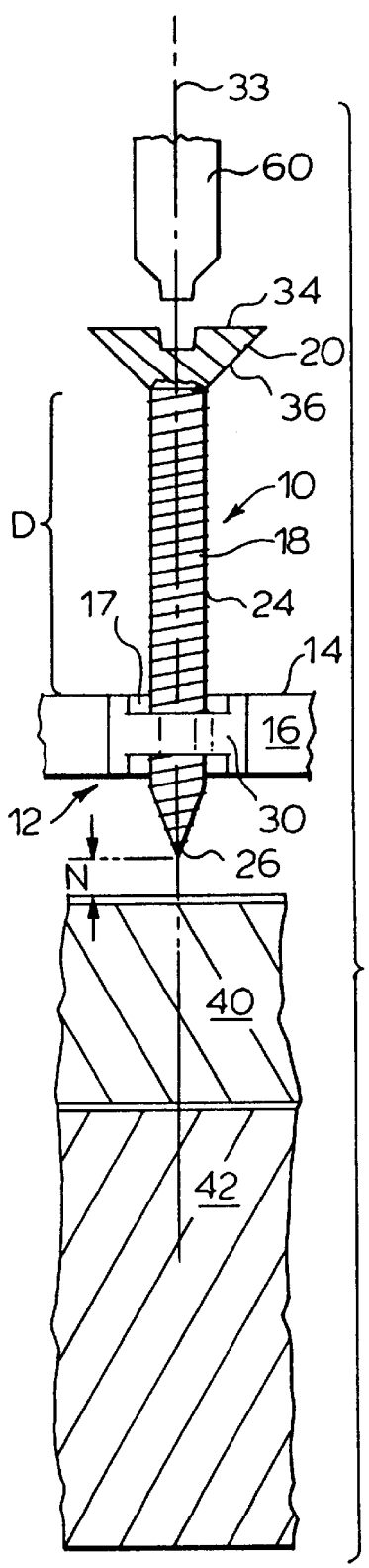
FIG. 1 is a schematic partially cross-sectional front view showing drywall screw on a holding strip collated in accordance with a first embodiment of the present invention and positioned over a layer of drywall on top of a wood frame, prior to the screw being driven.

Each of FIGS. 1 to 6 show one screw 10 held in a plastic holding strip 12 substantially in accordance with Canadian Patent 1,054,982. As is known, the strip 12 holds a plurality of screws in a row in identical manner, although only one screw 10 is shown.

The strip comprises an elongate thin band formed of a plurality of identical sleeves 14 interconnected by lands 16. A screw 10 is received within each sleeve 14. Each screw 10 has a head 20, a shank 18 carrying external threads 24 and tip 26. As shown, the external threads 24 extend from below the head 20 to the tip 26.

Figure 2:
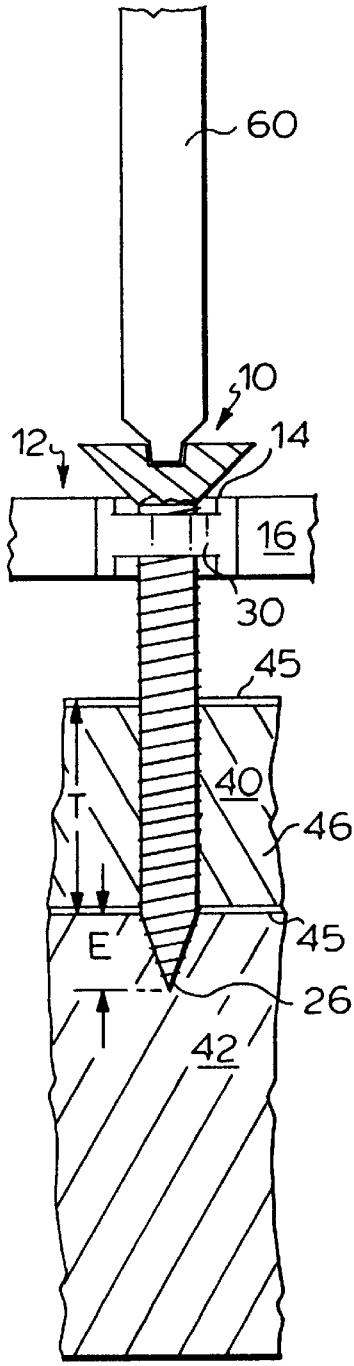
FIG. 2 is the same view as in FIG. 1 but with the screw having been driven until the head of the screw first engages the strip.

Each screw is substantially symmetrical about a central longitudinal axis 33. As best shown in FIG. 2, the head 20 has a top surface 34 and an under surface 36. The under surface 36 is shown to be conical about the longitudinal axis 33.

Each screw is received with its threaded shank 18 engaged within the sleeve 14. In forming the sleeves about the screw as in the manner described in Canadian Patent 1,040,600, the interior surfaces of the sleeves come to be formed with complimentary threaded portions which engage the external threads 24 of the screw 10. Each sleeve 14 has a reduced portion between the lands 16 on the first side of the strip and therefore on the first side of each screw. This reduced strength portion is shown as a substantially vertically extending longitudinal slot 17 bridged by a single thin strap-like portion or strap 30.

In each of FIGS. 1 to 6, a sheet of drywall is shown as 40 in cross-section above and over wooden supporting frame member 42 also shown in cross-section.

Figure 3:
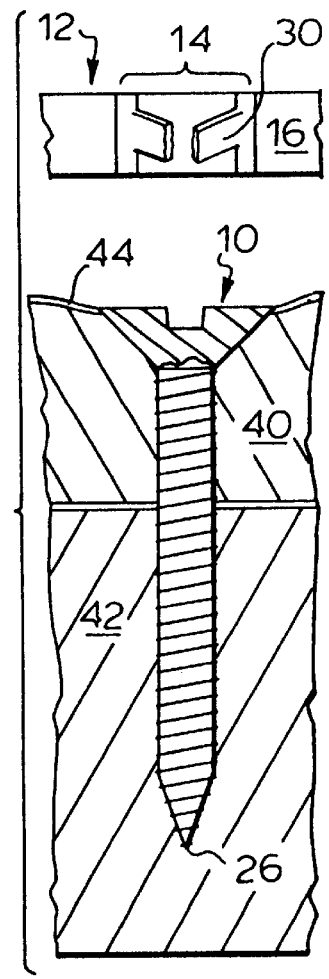
FIG. 3 is the same as FIGS. 1 and 2 but with the screw having been driven fully into the drywall and frame.
Figures 4, 5, 6:
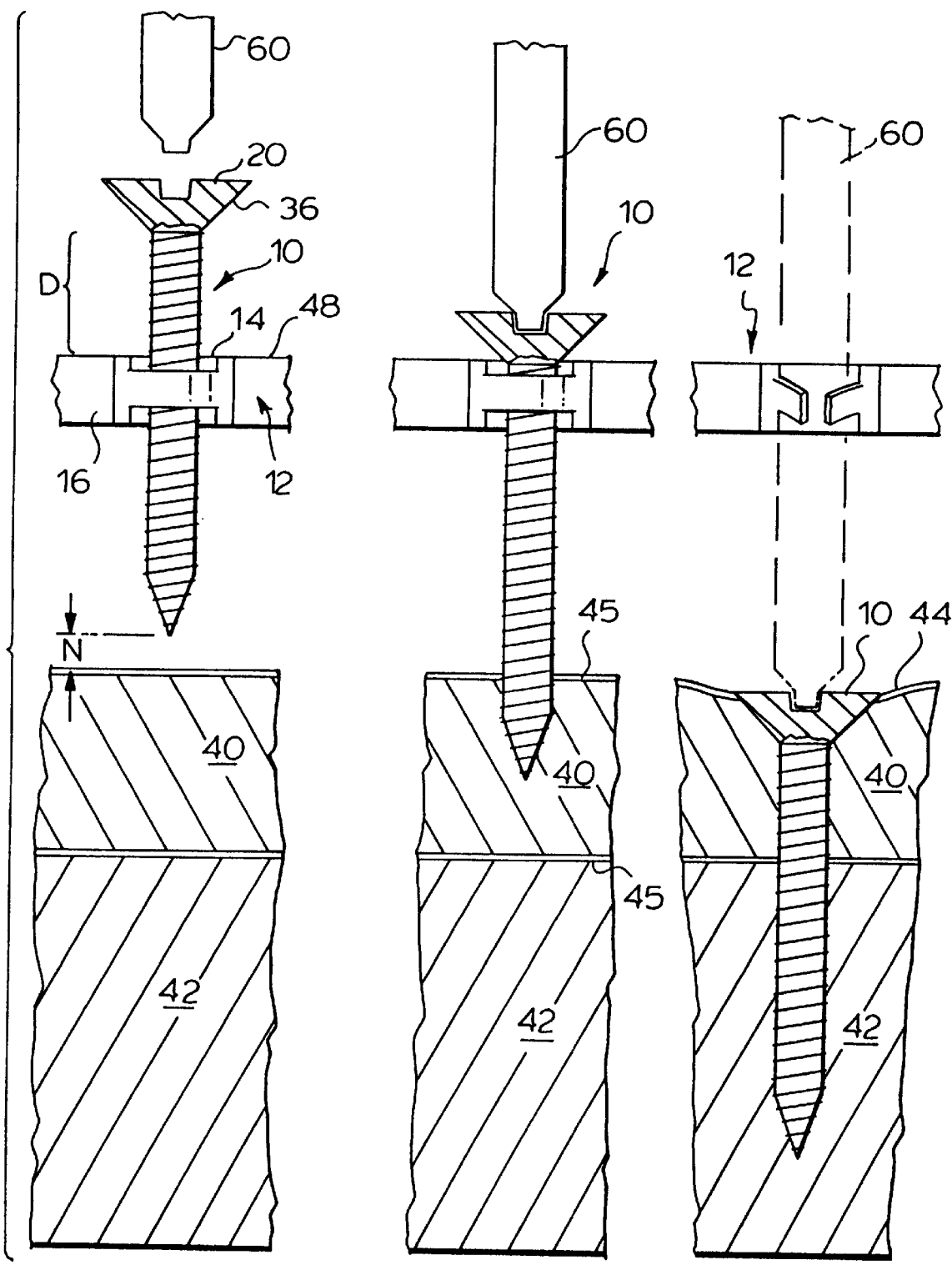
FIGS. 4, 5 and 6 are views corresponding to FIGS. 1, 2 and 3, however showing drywall screws in a holding strip collated in accordance with the prior art.

With both the collated screw strip in accordance with the present invention and those with the illustrated prior art, the screw is to be driven to assume the configuration shown in FIGS. 3 and 6 with the screw extending through the drywall 40 engaged in the wooden frame member 42 to secure the drywall 40 to the frame member 42. Preferably, as shown, the screw head 20 draws the outermost surface 44 of the drywall downwardly slightly to provide a recession or a dimple to be later filled with plaster-like material to hide the screw head.

In discussing the FIGS., the juxtaposition and movement of the screw, drywall, and wood frame will be described with reference to the words "up" and "down" as the screws are shown in each of the figures. It is to be appreciated that the drywall shown in the FIGS. may assume any positions such as, horizontal or vertical and the drywall may be drywall on a ceiling or a wall.

In each of FIGS. 1 to 6, the drywall 40, frame 42, screws 10 and holding strips are shown to be identical. The differences which are illustrated reside in the relative positions of the holding strip 12 relative to the screw 10 having regard to the thickness of the drywall 40.

For convenience, FIGS. 1 to 6 are proportioned to approximately illustrate a conventional drywall screw of 1¼ inch (3.175 cm) length to secure a drywall of a thickness of ½ inch (1.27 cm).

Reference is made first to FIGS. 1 to 3 showing a collated screw in accordance with the present invention. FIG. 1 shows the screw 10 and strip 12 held by the feed system of the power driver and positioned above the drywall ready to be engaged and driven by a screwdriver head 60. The screw tip 26 has not yet become engaged in the drywall.

With the screw in the position of FIG. 1, the rotating screwdriver head 60 moves downwardly to engage the recess in the screw head and rotate the screw. Initially, by reason of the sleeve being threaded, rotation of the screw advances the rotating screw downwardly relative to the sleeve and into engagement with the drywall. With the screw threads engaging the sleeve and the drywall, further rotation advances the rotating screw through the drywall and into threaded engagement with the frame member. With the screw threads engaging the sleeve, the drywall and the frame member, continued rotation advances the rotating screw downwardly to the position shown in FIG. 2 in which the screw head 20 and particularly its undersurface 36 first engages the strip. Further rotation of the screw, with the screw threads engaged in the frame member will forceably advance the screw head 20 through the sleeve 14, rupturing the fragible strap 30 and permitting the screw on continued rotation to move to the fully inserted position of FIG. 3.

The strip 12 is held against substantial downward movement by the power driver in known manner. Thus the strip 12 is shown maintained at a constant distance above the drywall in each of FIGS. 1 to 3.

FIG. 2 shows the position of the screw 10 relative to the strip 12 when the head 20 of the screw first engages the strip. In this position, as shown, the screw 10 is engaged within the frame member 42. Engagement of the screw in the frame member 42 assists in ensuring that the head 20 of the screw is advanced through the sleeve 14. To achieve this desired result, the distance D the screw must be driven before the head 20 engages the sleeve must be equal to the sum of the distances indicated as N, T and E, in which N is the height of the tip of the screw is held above the drywall prior to the screw being driven; T is the thickness of the drywall the screw traverses, and E is a distance the screw is desired to be driven into the frame member 42 to assist in providing positive engagement prior to the head 20 engaging the strip.

The distance N is typically determined by the nature of the driver being used and represents the distance the workpiece holds the tip of the screw above the workpiece before driving the screw. The distance N may be nil as with a power driver where the screw tip is disposed adjacent the surface 44 of the drywall prior to driving. With many conventional power drivers, the distance N is typically less than about ¼ inch (0 to 0.63 cm) and more typically is less than about ⅛ inch (0.32 cm). Distance N may also be substantial; that is ½ inch (1.27 cm) or greater.

FIG. 1 illustrates, a 1 1;4 inch (3.175 cm) drywall screw with drywall of the thickness T of about ½ inch (1.27 cm), a typical distance N of about ⅛ inch (0.32 cm) and a selected distance of engagement of about 3/32 inch (0.24 cm) to give an overall distance D of about 23/32 inch (1.83 cm) which is roughly about ¾ inch (1.9 cm). Another preferred configurations are 1⅛ inch (3.175 cm) drywall screw for metal studs with drywall of ½ (1.27 cm) and a distance D of about 23/32 inch (1.83 cm). Yet another is 1⅝ inch (3.98 cm) screw for ⅝ inch (1.58 cm) drywall with distance D of about ⅞ inch (2.22 cm).

Reference is now made to FIGS. 4 to 6 which illustrate prior art difficulties which the present inventor has appreciated and at least partially overcome.

FIGS. 4 to 6 illustrate a conventional collated drywall screw in which the distance D between the underside 36 of the head 20 of the screw 10 and the uppermost surface 48 of the strip 12 is illustrated as about ⅜ inch (0.95 cm). As a result, on driving the screw 10 from the position of FIG. 4, the head 20 of the screw engages the uppermost surface of the sleeve 14 before the screw passes through the drywall to the frame member 42. On further rotation in the position of FIG. 5, often times, the forces applied by a user to keep the screw driver head 60 in engagement in the screw head plus the forces developed by the threads of the screw engaging the drywall and engaging the sleeve are not great enough to draw the head of the screw through the sleeve. With the head caught on the strip, rotation results in the screw stripping the threads formed both in the drywall 40 and the sleeve 14 and the screw merely rotates without downward movement. With some power screwdrivers, this can be overcome by a user manually applying increased pressure onto the tool to force the head 20 through the sleeve. Applying increased pressure is tiring to the user and particularly disadvantage where screws are being driven upwardly into a ceiling or at places where a user must reach horizontally to one side.

When the screw "strips" the threads initially formed in the drywall, the screw acts like a drill or auger and breaks off and withdraws drywall particles through the paper covering 45 from the core 46 of the drywall. Such fine powder has been appreciated by the inventor to clog the power drivers particularly when screws are being driven vertically into a ceiling. The drill or auger like action of the rotating screw and withdrawal of drywall particles weakens the drywall and results in a weakened coupling of the drywall to the frame via the screw when the screw is finally driven into the frame.

The relative forces required to advance the head of a screw through the sleeve to fracture the sleeve; the forces required to maintain the screwdriver head engaged in the screw head; the drywall will withstand before becoming stripped; and the distance threaded sections of the screw engage into the drywall, and/or frame member prior to the head of the screw engaging the strip, will all factor in determining the distance D. Preferably, the screw may, at least, engage the second side of the drywall, that is, at least engage both side coverings 45 of the drywall. More preferably, as illustrated, the screw will positively engage the frame member before the head of the screw engages the sleeve.

Figure 7:
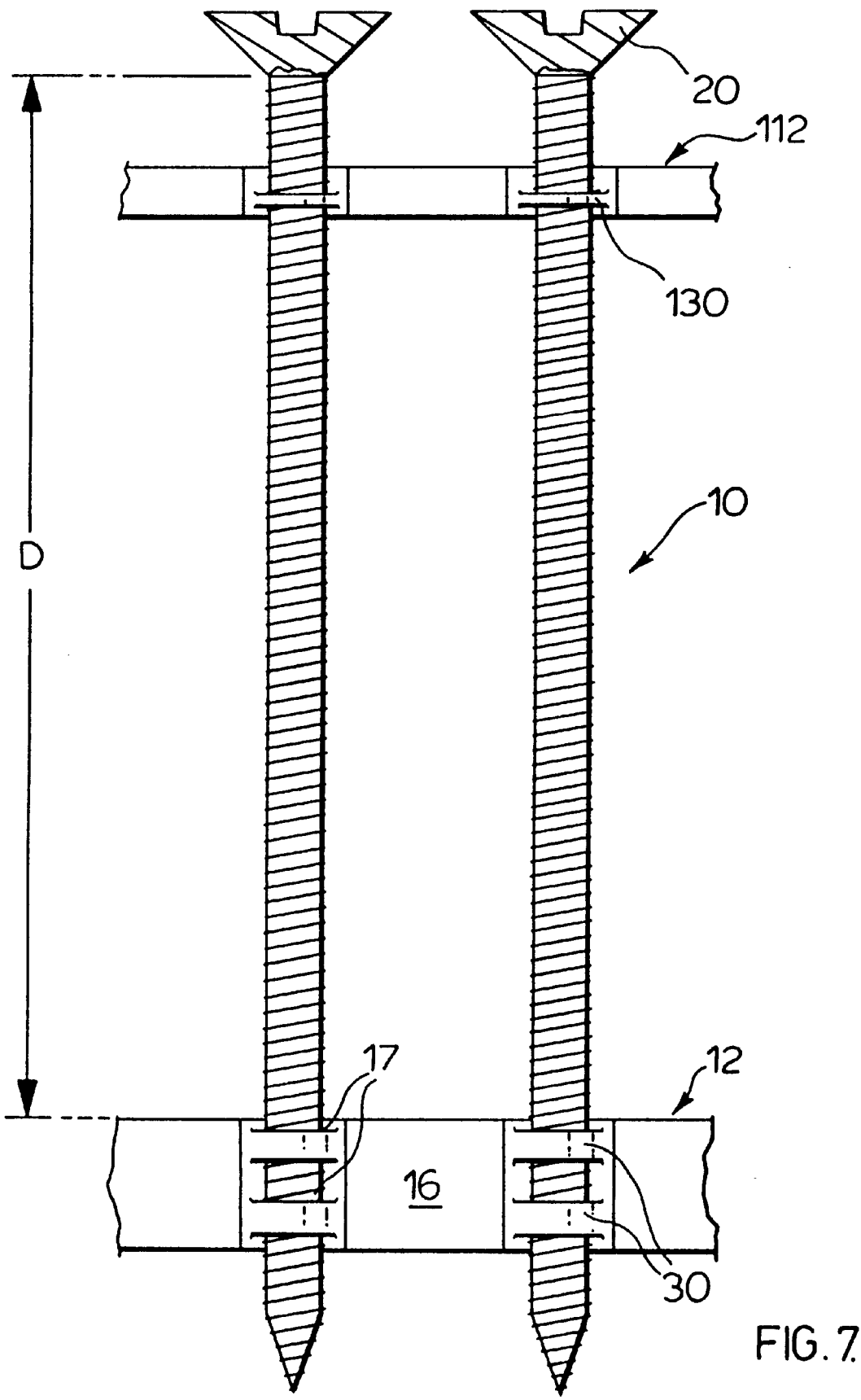
FIG. 7 is a side view showing two screws on a holding strip collated in accordance with a second embodiment of the present invention.
Figure 8:
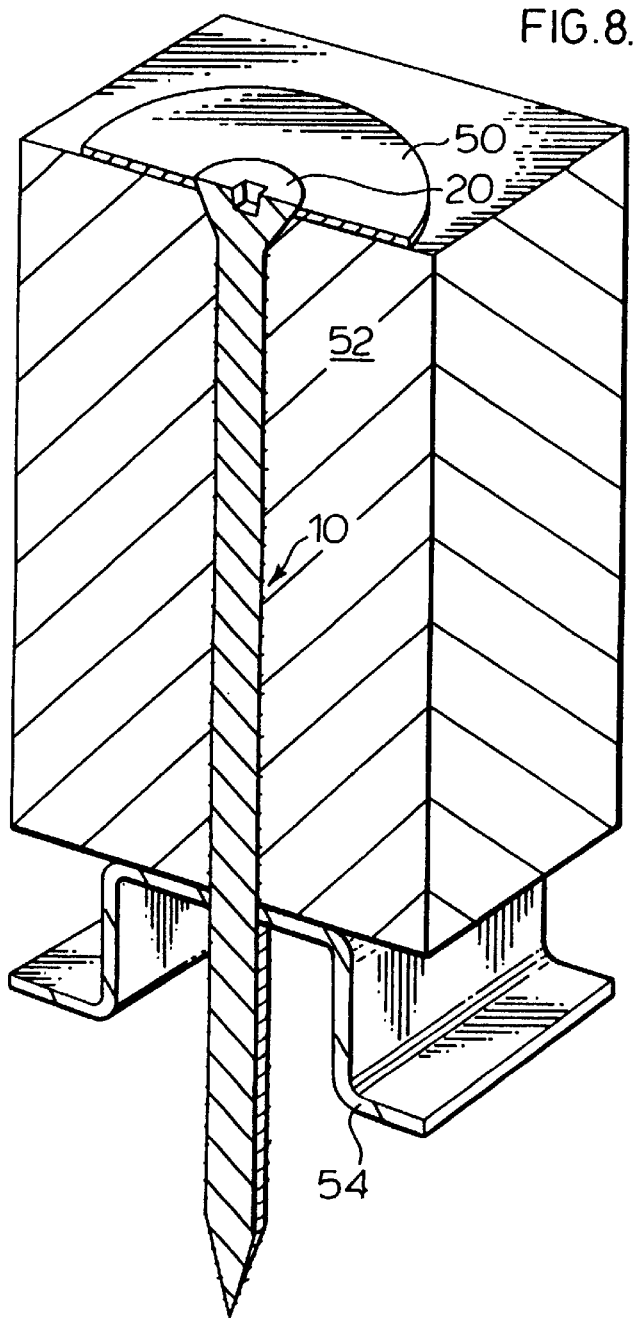
FIG. 8 is a partially cross-section pictorial view showing a screw in accordance with FIG. 7 securing insulation to a sheet metal structure.

Reference is now made to FIGS. 7 and 8 which show a second embodiment that the screw strip is in accordance with the present invention. In FIGS. 7 and 8, the same reference numerals as used in FIGS. 1 to 6 are used to refer to similar elements. FIG. 7 illustrates 3 inch (7.02 cm) long screws 10 secured together by two strips, a primary strip 12 and a secondary strip 112. The strip 12 differs from the strip 12 of FIG. 1 only in having two straps 30 and in extending a longer distance along the axis of the screw. The secondary strip 112 is provided near the heads of the screws. The secondary strip 112 is virtually the same as the strip 12 except having only a single strap 30 and extending a lesser distance along the axis of the screw. With the screw of FIG. 7 having a greater length, providing a secondary strip 112 assists in locating the screws and feeding them before being driven by a power driver.

As with the strip of FIG. 1, in FIG. 7, the distance D the head 20 must advance before engaging the primary strip 12 is selected to permit the screw 10 to pass through material to an extent that the purchase of the threads in the material will be sufficient to draw the head 20 through the strip. The relative strengths of the primary strip 12 and secondary strip 112 are selected such that the engagement forces created by the threaded shank being received in the sleeves 17 of the primary strip, either alone or together with the forces required to be applied to keep the screwdriver bit engaged in the screw head, will be sufficient, on rotating the head 20 with the strips 12 and 112 being held in place, to draw the head 20 through the secondary strip 112. Thereafter, when the head of the screw 20 comes to engage the primary strip 12, the engagement of the threaded shank in the material, either alone or together with the forces required to be applied to keep the screwdriver bit engaged in the screw head is sufficient to draw the head of the screw through the primary strip 12.

FIG. 8 illustrates the screw from the strip of FIG. 7 securing with the assistance of a circular washer 50 a 2 inch (5.08 cm) layer of insulation 52 to the sheet metal roof 54 of a sheet metal structure. Such a configuration arises, for example, in insulating structures formed by sheet metal by securing insulation over the sheet metal roof and thereafter applying a waterproof roof over the insulation. The strip of FIG. 7 is structured to permit the screw 10 to pass through the washer 50 and the insulation 52 and engage in the metal sheeting 54 before the head 20 comes to engage the primary strip 12. Arrangement similar to that shown in FIG. 8 may arise in structures formed from metal sheeting and, as well, another structure such as, for example, conventional frame construction wherein convention wooden stud framing members are replaced with U-shaped channel members formed from thin metal. The strip of FIG. 7 is advantageous for securing insulation and cladding panels to the thin metal studs forming the framing.

Insulation which may be secured includes rigid formed insulation such as STYRAFORM SM blue brand insulation of Dow Chemical Inc. and semi-rigid FIBREGLASS brand cladding panels formed by fibrous material to some extent bonded in situ. Cladding panels can include BLACK KOTE brand panels formed of soft particle board or of other fibrous materials and well known in conventional house construction in the United States. The washer 52 is shown as one vehicle to assist in distributing loading of the head 20 of the screw 10 over the surface of the relatively weak insulation or cladding material. Other devices, such as wood strappings and the like could be used.

The present inventor has appreciated that further similar difficulties arise when driving collated screws into weaker materials. For example, it might be desired to utilize collated screws to secure hooks, hangers, brackets, straps and the like merely to weaker materials such as drywall, insulation, cladding or particle board without screw engaging in any stronger underlying material. similarly, it might be desired to secure two weaker materials together such as by securing drywall to drywall or insulation to cladding. In these instances, having regard to the nature of the threads of the screw, the strength and thickness of the weaker material and the forces required for the screw to separate from the strip, screws may be collated so as to provide a strip in which the head is spaced from the strip a distance that prior to the head engaging the strip the screw is advanced sufficiently into the weaker material that the engagement of the threads in the weaker material alone will give rise to sufficient forces for the head to disengage the strip. With such weaker material, to the extent the screw is not advanced sufficiently into the weaker material at the time the head engages the strip, engagement of threads in the weaker material would not give rise to sufficient forces for the head to disengage from the strip and the screw may auger in strip its connection with the weaker material. Collated screw strips in accordance with the present invention may be configured to be useful for example securing devices and materials to weaker materials.

Figure 9:
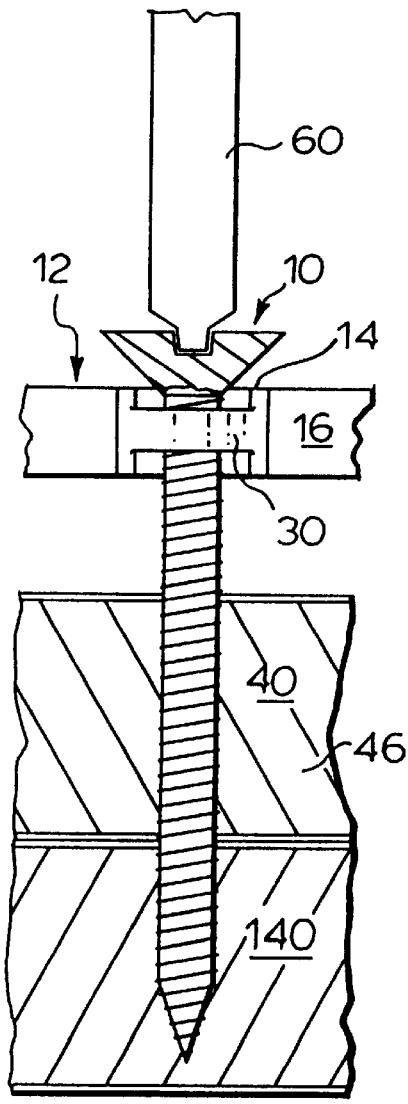
FIG. 9 is a view similar to FIG. 2 but showing a screw strip in accordance with a third embodiment securing two layers of drywall together.

In this regard, reference is made to FIG. 9 which illustrates in a drawing substantially the same as FIG. 2, a three inch (7.02 cm) drywall screw being utilized to secure two layers of ½ inch (1.27 cm) drywall together. In FIG. 9, the head 20 of the screw has been spaced from the strip 12 a distance such that the screw threads engage fully the thickness of the first layer of drywall 40 and a substantial portion of the thickness of the second drywall 140 before the head 20 engages the strip 12. The head of the screw does not engage the strip until the screw is advanced sufficiently into the drywall to withstand forces necessary to separate the screw from the strip. Collated screws in accordance with the present invention could be used to secure hooks to drywall between studs in a wall with the screw passing entirely through the drywall and engaging both inward and outward covering layers of the drywall before the head engages the strip. Driving screws into particle board would be another example where collated strip could advantageously have the head spaced from the strip sufficient distance that prior to the head engaging the strip, the screw would be sufficiently engaged within the particle board to prevent the screw from stripping and augering in the particle board on the head engaging the strip.

Strips in accordance with an aspect of the present invention may be characterized as having screws, preferably of a length of at least 1⅛ inch length, and having the strip spaced from the head by a distance which is at least ½ the length of the screw, preferably at least about 6/10; at least about ⅔; at least about 7/10; at least about ¾; or at least about 8/10. With the strip being spaced from the head, in whatever application they are used increased purchase of the screw may be achieved in the workpiece prior to the head engaging the strip which will reduce the likelihood of the screw stripping in the workpiece when the head engaging the strip. Particularly, preferred strips in accordance with the present invention are drywall screws, preferably of a length of at least 1⅛ inch (2.86 cm) or 1¼ inch (3.175 cm) in which the strip is spaced from the head at least about 60% of the length of the screw. Preferably for most drywall screws the strip is spaced from the head at least ¼ inch (0.64 cm) greater than the thickness of the drywall, i.e. ¾ inch for drywall of ½ inch and ⅞ inch for drywall of ⅝ inch.

While the preferred embodiments disclose the use of holding strips made of plastic, many other types of strips could be used in accordance with the invention. For example, strips formed from tapes, applied to one or both sides of the screws including tapes of paper-like and like substrates could readily be used to provide the desired spacing of the strip from the head.

The preferred embodiments shows strips with sleeves parallel the shank of the screw and joined by lands lying in a plane including the axis of the screws. Strips could be provided in which the strips do not have sleeves. Further, strips could comprise materials generally disposed in a plane perpendicular to the axis of the screws with opening therethrough to which the screws may pass. The strips of the illustrated embodiments are adapted to be coiled to reduce storage space. Coiling is not necessary and strips which retain a plurality of screw in a strange length could be used in accordance with the invention. In the context of FIG. 7, the primary and secondary strips may be of different materials. The preferred strips in accordance with the invention are those as illustrated in which after a screw is removed from the strip, the strip remains intact. This is not necessary and in many applications, strips may be used which are not retained intact on driving a screw. For example, a screw could be disengaged from the strip by breaking of the length of the strip.

The preferred embodiment of FIGS. 1 to 3 discloses a frame member as being a wooden frame or metal sheeting. Of course, other frame members could be used such as steel or aluminum channel studs, concrete blocks, plywood underlays, corrigated sheets of metal or fiberglass and the like.

The plastic strips illustrated in the drawings are preferred embodiments of Canadian Patent 1,040,600 however modified as in the case of FIG. 1 merely to utilize a single strap 30. To provide for greater stability having regard to the distance, between the head and the strip, as shown in FIG. 7, an elongated or reinforced sleeve could be used.

The preferred embodiments show screws having shanks threaded along their entire length. Screws which are merely threaded proximate their tips may be used and in some instances are preferred.

The head 20 of the drywall screw is illustrated in the Figures as having a generally conical undersurface 36 which tapers downwardly from the top surface 34 to merge with the shank. The distance indicated as D in the drawings is a distance from the top of the strip 12 to the head 20 shown to be measured from where the undersurface 36 merges into the shank. Typical drywall screws have a head 20 with an axial extent in the range of about $3/32$ inch to $3/16$ inch, most typically, about $1/8$ inch measured from the top surface 34 to where the undersurface 36 adopts a diameter substantially the same as the relatively constant diameter shank. The screws can be described as having the strip located either a distance from the head, that is, the distance D or a distance the top surface 34 of the strip. In a preferred embodiment in which N equals O, T equals $1/2$ inch and E equals about $3/16$ inch, then D, preferably, equals at least $19/32$ inch. In the context of a drywall screw in which D equals at least $19/32$ inch, the distance from the top surface 34 of the screw to the strip can be stated to be, preferably, at least $22/32$.

While the particular proportions of drywall screws will vary, preferred ranges for D for screws to be used with half inch drywall are D equals $19/32$; $20/32$; $21/32$; $22/32$; $23/32$; $24/32$ and greater inches. Preferred corresponding ranges for the distance from the top surface 34 of the screw to the top of the strip for screws for use with half inch drywall include $21/32$; $22/32$; $23/32$; $24/32$; $25/32$; $26/32$; $27/32$ and $7/8$ or greater inches.

Preferably, such screws for use with half inch drywall are of a length in the range of $1/8$ inch to about 2 inches. For screws to be used with drywall of any thickness, preferably D equals the thickness of the drywall plus a distance E with E to be in the range of $2/16$ inch, $3/16$ inch, $4/16$ inch, $5/16$ inch, $6/16$ inch or greater.

While the invention has been described with reference to preferred embodiments, the Invention is not so limited. Many modifications and variations will now occur to a person skilled in the art. For a definition of the invention, reference is made to the following claims.

I claim:

1. A screwstrip comprising:
   a plurality of screws;
   each screw having a head, a tip and a threaded shank,
   each screw having a total length from head to tip in the range of at least about $1\tfrac{1}{8}$ inches to about 2 inches,
   a holding strip holding the screws in parallel relation spaced in a row,
   the strip having a plurality of spaced parallel fragible sleeves,
   each screw received in a respective one of the fragible sleeves with the sleeve about its threaded shank with its head extending from one end of the sleeve and its tip extending from another end of the sleeve such that a screw on being screwed tip first relative the strip is separated from the strip by the head of the screw passing through the sleeve breaking the sleeve,
   the head of the screw being spaced from the strip by a distance of at least about $19/32$ inches.

2. A screwstrip as claimed in claim 1 wherein the length of the screw is at least about $1\tfrac{1}{8}$ inches and the head is spaced from the strip by a distance of at least about $23/32$ inches.

3. A screwstrip as claimed in claim 1 wherein the length of the screw is at least about $1\tfrac{1}{4}$ inches.

4. A screwstrip as claimed in claim 1 wherein the length of the screw is at least about $1\tfrac{1}{4}$ inches and the head is spaced from the strip by a distance of at least about $23/32$ inches.

5. A screwstrip as claimed in claim 1 wherein the length of the screw is at least about $1\tfrac{5}{8}$ inches and the head is spaced from the strip by a distance of at least $7/8$ inches.

6. A screwstrip as claimed in claim 1 wherein the length of the screw is at least about $1\tfrac{3}{4}$ inches and the head is spaced from the strip by a distance of at least $7/8$ inches.

7. A screwstrip as claimed in claim 1 wherein the screws are drywall screws.

8. A screwstrip as claimed in claim 7 wherein the holding strip consists of plastic material.

9. A screwstrip as claimed in claim 8 wherein the sleeves are uniformly spaced parallel sleeves interconnected by lands,
   the sleeves have a reduced strength portion between the lands such that a screw on being threaded tip first relative the strip is separated from its sleeve by breaking the reduced strength portion while simultaneously maintaining the length of the strip substantially intact and while guiding the screw by threaded engagement of the screw in its respective sleeve.

10. A screwstrip as claimed in claim 9 wherein the length of the screw is at least about $1\tfrac{1}{8}$ inches and the head is spaced from the strip by a distance of at least about $23/32$ inches.

11. A screwstrip as claimed in claim 9 wherein the length of the screw at least about $1\tfrac{1}{4}$ inches and the head is spaced from the strip by a distance of at least about $23/32$ inches.

12. A screwstrip as claimed in claim 9 wherein the length of the screw is at least about $1\tfrac{5}{8}$ inches ad the head is spaced from the strip by a distance of at least $7/8$ inches.

13. Collated screws comprising:
    a plurality of screws of a length of in the range of at least $1\tfrac{1}{8}$ inches to 2 inches,
    a holding strip holding the screws spaced in a row with each screw received in the strip with the strip about a shank of the screw such that a screw on being threaded tip first into a workpiece is separated from the strip by a head of the screw engaging the strip,
    the head being spaced from the strip a distance equal to at least one half of the length of the screw.

14. Collated screws as claimed in claim 13 wherein
    the strip has sleeves,
    each shank is received in a sleeve,
    a screw is separated from the strip by the head of the screw engaging the sleeve.

15. Collated screws as claimed in claim 14 wherein
    each sleeve is a fragible sleeve, a screw is separated from the strip by the head passing through the fragible sleeve breaking the fragible sleeve.

16. Collated screws as claimed in claim 14 wherein the shank threaded, and the sleeve threadably engages the threaded shank of the screw such that on a screw being threaded into the workpiece, the sleeve guides the screw by threaded engagement.

17. Collated screws as claimed in claim 16 wherein the strip comprises a continuous unitary strip of plastic material comprising the spaced parallel sleeves interconnected by lands.

18. Collated screws as claimed in claim 15 wherein the sleeve has a reduced strength portion between lands on a first side of the screws such that a screw on being treaded into a workpiece is automatically separated from its sleeve while simultaneously maintaining the length of the strip substantially intact.

19. Collated screws as claimed in claim 13 wherein the head is spaced from the strip by a distance of at least 7/10 of the length of the screw.

20. Collated drywall screws adapted for securing a layer of drywall to underlying support means comprising:

a plurality of screws, each screw having a head, a tip and a threaded shank, a holding strip holding the screws in parallel relation spaced in a row, the strip having a plurality of spaced parallel fragible sleeves, each screw received in a respective one of the fragible sleeves with the fragible sleeve about its threaded shank such that a screw on being screwed tip first relative the strip is separated from the strip by the head of the screw passing through the sleeve breaking the sleeve, the head of the screw being spaced from the strip by a distance greater than the thickness of the drywall which the screw is to secure.

* * * * *